(No Model.)
T. CURLEY.
CORKSCREW.
No. 297,232. Patented Apr. 22, 1884.
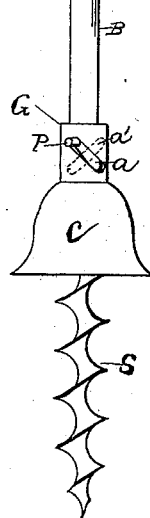
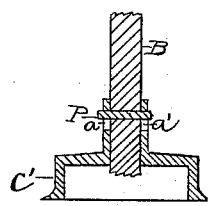
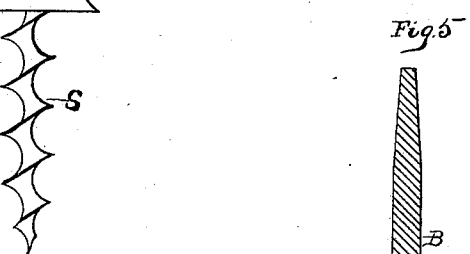
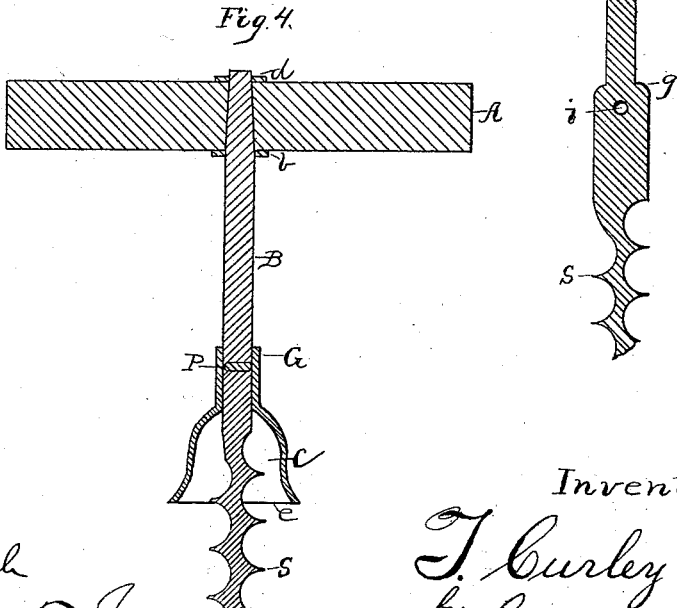

UNITED STATES PATENT OFFICE.

THOMAS CURLEY, OF TROY, NEW YORK.

CORKSCREW.

SPECIFICATION forming part of Letters Patent No. 297,232, dated April 22, 1884.

Application filed February 21, 1884. (No model.)

*To all whom it may concern:*

Be it known that I, THOMAS CURLEY, a resident of the city of Troy, in the county of Rensselaer and State of New York, have invented certain new and useful Improvements in Corkscrews; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Similar letters refer to similar parts in the several figures therein.

My invention relates to improvements in corkscrews; and it consists in providing the screw-shank with a cup loosely fitting to revolve thereon, the movements of the cup being controlled by a pin projecting from said shank into slots in said cup.

The object of my invention is to provide for easily and quickly disengaging a cork from the corkscrew after it has been drawn from a bottle.

Figure 1 of the drawings is a side elevation of my improved corkscrew. Fig. 2 is a central vertical section with a modified form of cup. Fig. 3 is a top plan view of the cup shown in Fig. 1, detached from the screw-shank. Fig. 4 is a central vertical section of the corkscrew shown in Fig. 1. Fig. 5 is a central vertical section of the screw and shank, showing a shoulder at $g$.

The screw-shank B is provided at one end with a handle, A, adapted to revolve it, and at the other end with the screw S, to enter a cork. The shank, at a point near its junction with the screw, is provided with a pin, P, passing through the same, preferably so as to project on both sides of the shank, which is preferably enlarged at this point, as shown at $g$ in Fig. 5, wherein is also shown the aperture $i$, in which is inserted the pin P. The cup C is provided with a sleeve, G, adapted to fit loosely upon the shank and revolve thereon. This sleeve is also provided with a slot, $a$, or slots $a\ a'$ on opposite sides, adapted to receive the projecting ends of said pin. The slot $a'$ is shown in dotted lines in Fig. 1. The shank is first inserted in the sleeve of the cup until the aperture $i$ occupies a position between said slots $a\ a'$, when the pin P is inserted through said slots in said aperture $i$ in the shank. The slots extend diagonally across the sleeve, as shown in Fig. 1.

The operation of the parts is as follows: If the corkscrew is held in a vertical position, as shown in Fig. 1, the cup will always fall down to the position shown, in which the projecting point of pin P rests in the upper end of the slot or slots. The screw is then inserted in the cork to be removed by turning the handle until the cork is drawn up into or against the cup with sufficient force to render the friction between the cork and cup greater than between the cork and neck of the bottle when the cork revolves with the screw in the bottle, and is easily withdrawn by a twisting pull upon the handle of the implement. The pin P has held the cup and caused it to revolve with the shank to twist the cork; but the moment the cork leaves the bottle the elasticity of the cork causes it to react and force the screw-shank down through the cup or permit of its being easily done by turning the handle backward in the cup, the pin P traveling down the slots. The great friction between the cup and top of the cork is thus easily overcome, and the cork may be readily turned off the screw.

I am aware that corkscrews have been constructed with a tight-fitting cup upon a screw-shank adapted to draw the cork up into the cup by revolving the screw after the cup comes in contact with the bottle; but the usefulness of such a form of construction was greatly impaired and often destroyed by the difficulty experienced in removing the cork from the cup after it has been drawn from the bottle.

By employing a loose-fitting cup arranged as I have described, the cork is easily removed from the cup, and with little or no injury to the cork. If the stop or pin P is simply a projection integral with said shank, and the slots $a\ a'$ merely grooves adapted to receive said projection or projections, such a form of construction would not depart from the spirit of my invention.

What I claim as new, and desire to secure by Letters Patent, is—

A corkscrew-shank having a suitable screw and handle, and provided with a projecting stop, P, in combination with cup C, having a sleeve, G, adapted to loosely fit said shank, and provided with one or more slots or grooves, a a', adapted to receive said stop, substantially as described, and for the purposes set forth.

In testimony whereof I have hereunto set my hand this 19th day of February, 1884.

THOMAS CURLEY.

Witnesses:
  GEO. A. MOSHER,
  W. H. HOLLISTER, Jr.